(12) United States Patent
Mundy

(10) Patent No.: US 6,256,645 B1
(45) Date of Patent: Jul. 3, 2001

(54) STORAGE MANAGER WHICH SETS THE SIZE OF AN INITIAL-FREE AREA ASSIGNED TO A REQUESTING APPLICATION ACCORDING TO STATISTICAL DATA

(75) Inventor: Paul Mundy, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/108,921

(22) Filed: Jul. 1, 1998

(30) Foreign Application Priority Data

Feb. 14, 1998 (GB) .................................................. 9803093

(51) Int. Cl.⁷ ..................................................... G06F 12/00
(52) U.S. Cl. ................................ 707/205; 707/7; 707/206
(58) Field of Search ..................................... 707/205, 206, 707/7, 101; 711/171, 152, 153, 147; 710/127; 400/74; 360/48

(56) References Cited

U.S. PATENT DOCUMENTS

| 5,367,637 | 11/1994 | Wei ........................................ 710/56 |
| 5,568,635 | * 10/1996 | Yamaguchi .......................... 711/171 |
| 5,784,699 | * 7/1998 | McMahon et al. .................. 711/171 |
| 5,797,689 | * 8/1998 | Oyama et al. ........................ 400/74 |

FOREIGN PATENT DOCUMENTS 1508731   4/1978  (GB) .

OTHER PUBLICATIONS

IEEE Publication, "Improving File System Performance by Dynamically Restructuring Disk Space", by Shane McDonald et al., Department of Computational Science, University of Saskatchewan, Canada, pp. 264–269, Jan. 1989.*

IEEE Publication, "A High Performance Memory Allocator for Object–Oriented Systems", by J. Morris Chang et al., pp. 357–366, Jan. 1989.*

IBM Technical Disclosure Bulletin, "Method for Improved Allocation of Computer Disk File Space Based on File Size Distribution Experience" by Bryant et al., pp. 1–5, Mar. 1985.*

IBM Technical Disclosure Bulletin vol. 27 No. 10B, Mar. 1985, "Method for Controlling Fragmentation Loss of Computer Disk File Space", by R M Bryant and P A Franaszek p. 6073–6074.

IBM Technical Disclosure Bulletin vol. 27 No. 10B, Mar. 1985, "Method for Improving Allocation of Computer Disk File Space Based on File Size Distribution Experience", by R M Bryant and P A Franaszek p. 6075–6079.

IBM document No. ZW84–5434–00, Feb. 9, 1998, "Storage Manager Component Structure Document DB2 Version 4 Release 1" p 1–135.

StratosWare Corporation, "C–Heap Standard for DOS", pp1–3, http://www.stratosware.com/products/ch/ch_a.htm (No Publication Date: Internet Print Date Jan. 16, 1998).

(List continued on next page.)

*Primary Examiner*—Thomas Black
*Assistant Examiner*—Diane D. Mizrahi
(74) *Attorney, Agent, or Firm*—Prentiss W. Johnson

(57) ABSTRACT

A storage manager located between a plurality of requesting applications and a memory shared between the applications, has: a receiving unit for receiving a present memory access request from a first of said plurality of requesting applications; an accessing unit for accessing statistical data, the data based on collected values of sizes of initial free areas from prior memory access requests from the first requesting application; and a setting unit for setting a value of an initial free area for use by the present memory access request based on the accessed statistical data.

4 Claims, 2 Drawing Sheets

OTHER PUBLICATIONS

Franklin & Marshall, "Controlling Your Computer's Memory", p1, http://www.fandm.edu/department . . . r/Documentation/memcontrol.html (No Publication Date: Internet Print Date Jan. 16, 1998).

(No Publication Date: Internet Print Date Jan. 15, 1998) "Memory Management", pp1–2, http://www,cs,uoregon.edu/~jwthomas/os9/memory.html.

SmartHeap, "Why you still need SmartHeap in 32–bit Windows", pp1–6, http://www.heapagent.com/prod_sh/sh_perf.htm (1993–1997).

"*The IntranetWare Server Memory Architecture*", pp1–8, http://cdr.netpub.com/research/appnotes/1997/march/1/1.htm.

"*Memory Management in GRAPE*", p1, http://www.mathematik.uni–freiburg.de/Grape/DOC/HTML/node95.html (No Publication Date: Internet Print Date Jan. 29, 1998).

* cited by examiner

STORAGE MANAGER WHICH SETS THE SIZE OF AN INITIAL-FREE AREA ASSIGNED TO A REQUESTING APPLICATION ACCORDING TO STATISTICAL DATA

FIELD OF THE INVENTION

The present invention relates to computer systems and in particular, storage managers for controlling the assignment of storage locations to users in a situation where a common block of storage is to be shared by a plurality of users in an efficient manner.

BACKGROUND

In modern computer systems, many users often share a common block (i.e., section) of memory so that a highly efficient use of the memory is achieved. That is, oftentimes, users only need access to the memory for a short period of time, so it would be highly inefficient to totally dedicate portions of the memory block to particular users even during times when such users are not requesting access to the memory. Instead, when a user wishes to use a part of the memory block, the user makes a request to a storage manager which temporarily allocates a portion of the memory block to the requesting user. When the requesting user is finished with the allocated portion, the storage manager releases the allocated portion so that a future request (possibly from a different user) can now use this portion of the memory block.

An example of a conventional system will now be described with reference to FIGS. 1, 2 and 3. In FIG. 1, a plurality of requesting applications (11a, 11b, 11c), are simultaneously requesting access to a block of memory within memory 13, which could be semiconductor memory, a hard disk, or any other type of memory. The requesting applications must first contact a storage manager 12 which performs the function of temporarily allocating portions of the memory block to each requesting application. For example, as shown in FIG. 2, the storage manager temporarily assigns area 21 of memory block 131 to requesting application 11a, area 22 to application 11b and area 23 to application 11c. If application 11a uses up its allocated area 21 and needs more space, the storage manager assigns a new area 31 (see FIG. 3) to application 11a. Similarly, if applications 11b and 11c request more space, areas 32 and 33, respectively, are assigned thereto by the storage manager 12.

As can be seen in FIG. 3, the memory block 131 soon becomes cluttered with assigned areas. As more and more areas become assigned to requesting applications, the memory is said to become "fragmented" since the available space has been split up so many times between the same few applications. A major problem with this system is that a new requesting application may not be able to have space allocated to it, since the previous applications have been allocated space that extends throughout the block 131. Although there is space in between the allocated areas (e.g., between areas 31 and 32) this space soon closes in as more areas are allocated and soon such spaces become very small. This inefficiency is known as external fragmentation.

One solution to this fragmentation problem is to provide an initial free area (41, 42, 43 in FIG. 4) to each requesting application (11a, 11b, 11c, respectively). When a requesting application makes a first request to the storage manager 12 for a memory area, the requesting application informs the storage manager of the amount of memory that it will require for the lifetime of the particular session in which the application needs the use of the memory. The storage manager then allocates an area of this size to the application. As the application makes requests for storage, all of the requests are satisfied from the initial free area assigned to that requesting application. This greatly reduces the fragmentation problem since all of an application's assigned memory areas are confined to the initial free area, thus preventing the storage manager from assigning a particular application memory areas interspersed throughout the block.

However, this technique is disadvantageous in that the requesting application must provide the storage manager with the amount of memory space that will be needed by that application, thus imposing a burden on the requesting application. For example, this may entail the requesting application keeping statistics from previous runs. This presents a drain on the requesting application's processing power, and the application is thus diverted from focusing on its core functions.

Further, if the requesting application requests too much space, then an inefficiency known as internal fragmentation results wherein allocated space in the initial free area goes unused by the requesting application and is thus also unusable by other applications. If the requesting application requests not enough space, the storage manager will begin to assign areas outside of the initial free area to the application, resulting in the external fragmentation described above.

SUMMARY OF THE INVENTION

According to one aspect, the present invention provides a storage manager apparatus located between a plurality of requesting applications and a memory shared between the applications, comprising: a means for receiving a present memory access request from a first of the plurality of requesting applications; a means for accessing statistical data, the data based on collected values of sizes of initial free areas from prior memory access requests from the first requesting application; and a means for setting a value of an initial free area for use by the present memory access request based on the accessed statistical data.

Preferably, the statistical data is a weighted average of sizes of initial free areas from prior memory access requests.

Further preferably, the apparatus further includes:a means for monitoring a total amount of memory used by the present memory access request until the initial free area is returned to the storage manager for assignment to another requesting application; and a means for re-calculating the statistical data for the first requesting application based on the monitored total amount.

According to a second aspect, the invention provides a method for carrying out the functional steps described above in conjunction with the first aspect of the invention.

According to a third aspect, the present invention provides a computer program product for, when run on a computer, carrying out the functional aspects described above in conjunction with the first aspect of the invention.

Thus, with the present invention, the requesting application is relieved from the task of determining the amount of memory it will need and providing this amount to the storage manager. Further, as the storage manager selects a size of the initial free area that is based on the prior history of use for this particular requesting application, there is a good chance that the size will be selected in such a way that it provides a satisfactory compromise between the problems associated with setting the size too big and those associated with setting the size too small.

BRIEF DESCRIPTION OF THE DRAWINGS

The details of the present invention will be better understood by reference to the below description of a preferred embodiment described in conjunction with the following drawing figures (some of which have already been mentioned in conjunction with the prior art discussed above).

DETAILED DESCRIPTION OF THE PREFERRED EMBODIMENTS

Figure 1:
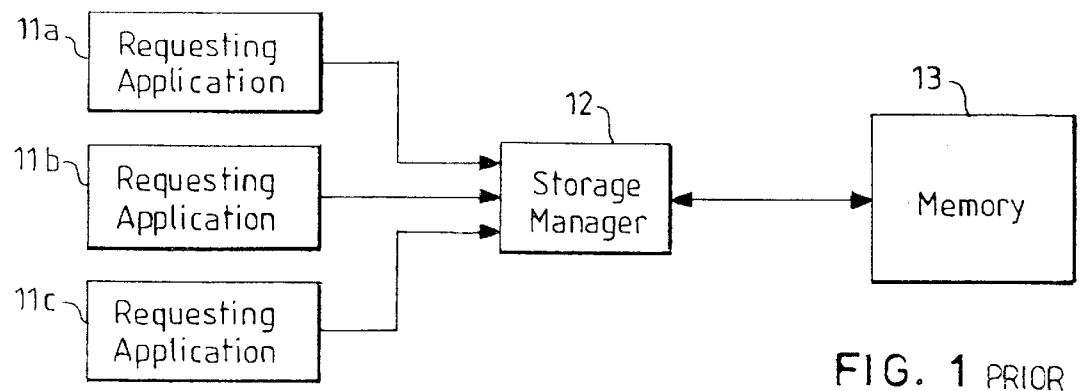
FIG. 1 is a block diagram showing the major portions of a system to which the described prior art and the preferred embodiments of the present invention are applied.
Figure 2:
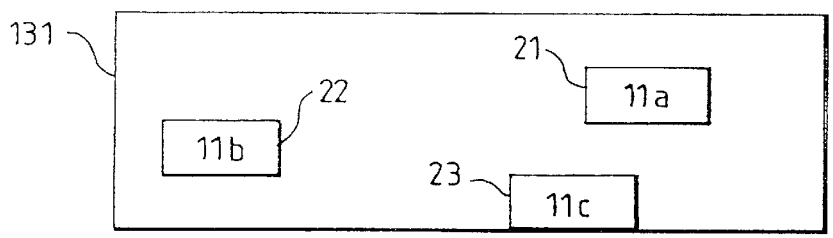
FIGS. 2 and 3 illustrate assigned portions of a memory block according to the operation of one prior art storage manager system.
Figure 3:
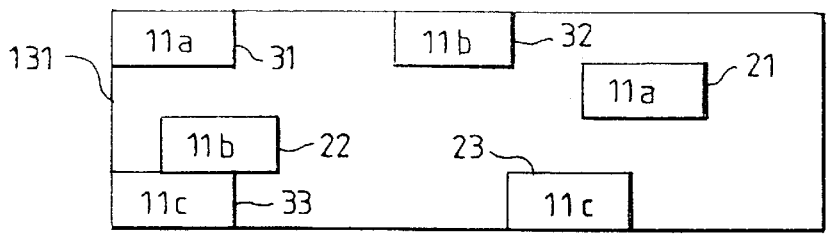
Figure 4:
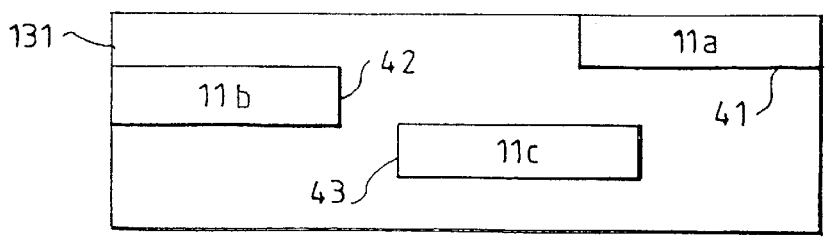
FIG. 4 illustrates assigned portions of a memory block according to the operation of a second prior art storage manager system.

According to a preferred embodiment of the present invention, the storage manager 12 of FIG. 1 operates according to the below flowchart of FIG. 5.

When the storage manager 12 receives a request (step 51) from a requesting application (e.g., 11a) for a memory area in a memory block shared by a plurality of requesting applications (e.g., 11a, 11b, 11c), the storage manager 12 accesses (step 52) from a local cache, statistical data, which the storage manager has previously collected, concerning the amount of storage space which this particular requesting application has required in past runs. That is, as the storage manager 12 is always involved when a requesting application wishes to be allocated some memory, it acts as a central repository for collecting statistical data about the amount of memory which requesting applications have required in the past.

Specifically, the storage manager 12 uses a weighted average of the collected amounts of storage which this application 11a has required on past runs, so that the system is not affected by large variations in initial free area size from run to run. The storage manager's cache stores a table (see FIG. 6) of requesting application in one column 61 and that requesting applications's corresponding weighted average of collected initial free area sizes from past runs in column 62.

At step 53, the storage manager 12 uses the stored weighted average for application 11 to set the value (4 kilobytes (k)) of the size of the initial free area to be allocated to requesting application 11a. At step 54, the storage manager assigns this initial free area to the requesting application 11a, with the size of the initial free area being the weighted average (4 k) that was stored in the cache.

After the initial free area is assigned to the requesting application 11a, the requesting application proceeds to use up the area with its various requests for memory space, with all of such requests for memory space being confined to the initial free area (as in the second prior art technique described above). The storage manager monitors the total amount of space actually used up by the requesting application (step 55) until the requesting application indicates that it is finished and the storage manager releases the initial free area for use by other requesting applications. If this total amount of space is greater than the value (e.g., 4 k) that was found in column 62 of the table of FIG. 6, then the storage manager will have to assign values outside of the initial free area for use by this application, thus resulting in external fragmentation of the memory block.

This total monitored amount from this run (it could be greater than or less than 4 k in the example) is then used as an input to re-calculate the weighted average of such amounts from previous runs (step 56) and the table stored in the cache is then updated (step 57).

For example, if the requesting application used only 2 k of the assigned 4 k initial free area in this run (thus resulting in internal fragmentation), the re-calculated weighted average would be lower than 4 k, so that on the next run, a smaller initial free area (e.g., a value less than 4 k) would be set at step 53. Thus, on the next run, the likelihood that the internal fragmentation experienced on the previous run will be repeated is greatly reduced.

On the other hand, if the requesting application used a total of 8 k and thus surpassed the size of the 4 k initial free area, the re-calculated average would be higher than 4 k, so that on the next run, a larger initial free area (e.g., a value greater than 4 k) would be set at step 53. Thus, on the next run, the likelihood that the external fragmentation that was experienced on the previous run will be repeated is greatly reduced.

In this way, an optimum value of the size of the initial free area is assigned to a requesting application, based on prior history of that application's use of the shared memory.

These values do not have to be specified by the requesting application, but are dynamic and self-tuning based on this application's past and current usage of the shared storage.

These collected statistics for each application are written to disk from time to time so that they are available in the event of a system crash or hardware failure. Preferably, data is written to disk under a system task so that the pathlength of main-line requests is not affected.

Further, the "self-tuning" feature can be made optional by setting a parameter on a requesting application's request for an initial free storage area, which indicates that the initial free area is to be "self-tuned". This option need only be specified for certain requests. That is, the self tuning feature may only be used for certain requesting applications and not used for others.

The weighted average mechanism is designed to cope with fluctuations over a long period of time (perhaps a week), since it is assumed that the usage of the system may vary a great deal according to the time of day and the day of the week.

Figures 5, 6:
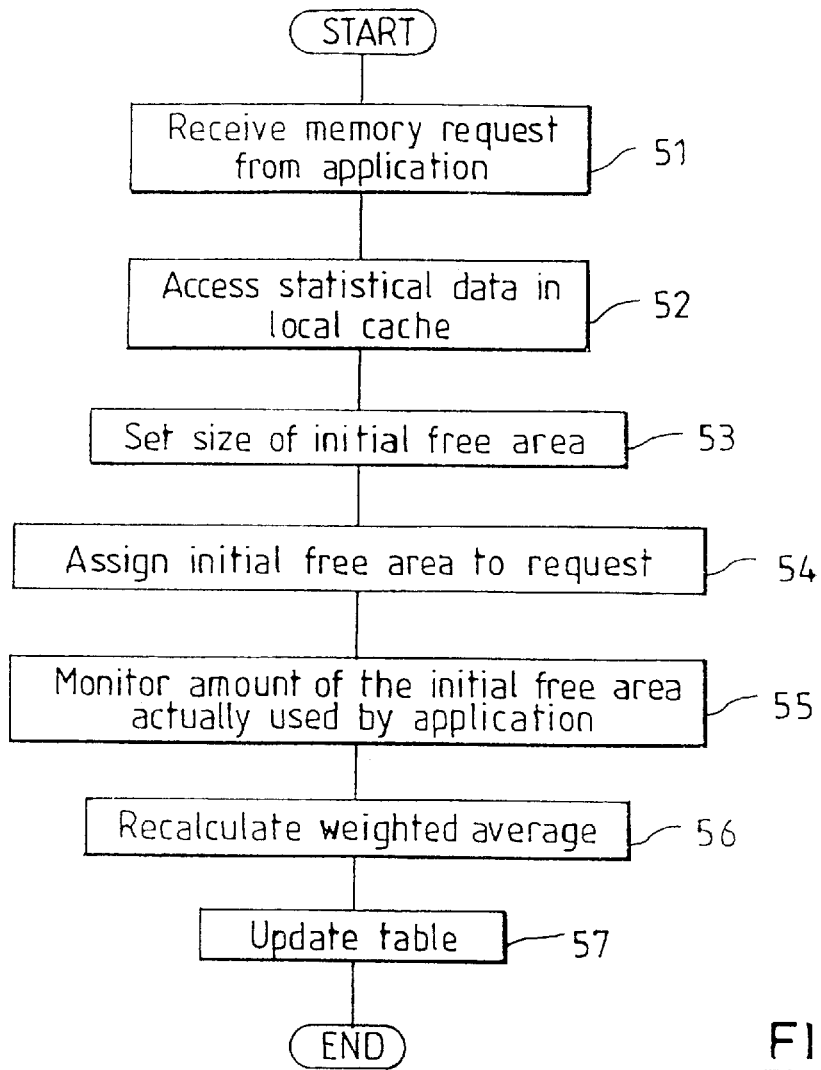
FIG. 5 is a flowchart showing the steps carried out by a storage manager according to a preferred embodiment of the present invention.
FIG. 6 is a table showing stored statistical information used by the storage manager in carrying out the steps of FIG. 5.

For early runs before any statistical data is collected, there is no record present in the table of FIG. 6, so the value for the initial-free area size is set to an arbitrary amount (e.g., 4 k). As more and more runs are made, this amount will become tuned to the history of that particular requesting application (by repeated passes through the flowchart of FIG. 5).

If there is a value stored, however, the size of the initial free area is set equal to the stored weighted average (step 53), which can be then rounded up to the next power of 2, and subject to a maximum of 64K.

If demand from the requesting application drops or increases significantly during any period, the effects of the change will be reduced by the weighted average mechanism. The weighted average can easily be changed to react to increases more readily than decreases.

In the above-description, when a requesting application uses up its initial free area, it was described that external fragmentation occurred, as additional areas outside of the initial free area are assigned to the requesting application. In order to reduce the effects of such external fragmentation that occurs in early runs where statistics are being collected, a known technique can be advantageously used in the process described above.

Specifically, *IBM Technical Disclosure Bulletin*, Vol. 27 No. 10B March 1985, describes a storage management technique whereby if an initial free area is used up by a requesting application, an additional (or secondary) initial free area is allocated to the requesting application. Thus, even though external fragmentation is occurring, the "spill-over" from each requesting application is confined to the secondary initial free area, thus avoiding the problem of a requesting application's "spill-over" being interspersed throughout the memory block. This increases the chances that there will be enough space in the shared memory block to allocate to a new requesting application.

Thus, when this known technique is used as part of the present invention, once the initial free area is assigned at step 54, the requesting application will proceed to use up the initial free area (referred to hereinbelow as the primary initial free area) and if it so happens that the requesting application uses more memory than the primary initial free area will allow, a secondary initial free area is assigned.

The size of this secondary initial free area can either be set as a constant value (e.g., 4 k) for every requesting application, or it can be set at the same value as the primary initial free area. It could also be set at some value which is related to the size of the primary initial free area. For example, the size of the secondary initial free area can be set at half of the size of the primary initial free area.

Therefore, the incorporation of this known technique into the present invention minimizes the effects of external fragmentation that occur when a requesting application uses up its initial free area and needs additional storage space in the memory block.

I claim:

1. A storage manager apparatus located between a plurality of requesting applications and a memory shared between the applications, comprising:

means for receiving a present memory access request from a first of said plurality of requesting applications;

means for accessing statistical data wherein said statistical data is a weighted average of sizes of initial free areas from prior memory access requests, said data based on collected values of sizes of initial free areas from prior memory access requests from the first requesting application;

means for setting a value of an initial free area for use by the present memory access request based on the accessed statistical data;

means for monitoring a total amount of memory used by said present memory access request until the initial free area is returned to the storage manager for assignment to another requesting application; and means for re-calculating the statistical data for the first requesting application based on the monitored total amount.

2. The apparatus of claim 1, wherein said apparatus further comprises:

means for assigning a secondary initial free area for use by said present memory access request if said initial free area set by said means for setting is totally used up by said present memory access request.

3. A storage management method which takes place in a storage manager located between a plurality of requesting applications and a memory shared between the applications, comprising steps of:

receiving a present memory access request from a first of said plurality of requesting applications;

accessing statistical data wherein said statistical data is a weighted average of sizes of initial free areas from prior memory access requests, said data based on collected values of sizes of initial free areas from prior memory access requests from the first requesting application;

setting a value of an initial free area for use by the present memory access request based on the accessed statistical data;

monitoring a total amount of memory used by said present memory access request until the initial free area is returned to the storage manager for assignment to another requesting application; and re-calculating the statistical data for the first requesting application based on the monitored total amount.

4. A computer program product stored on a computer readable storage medium for, when run on a computer, carrying out a storage management method which takes place in a storage manager located between a plurality of requesting applications and a memory shared between the applications, comprising steps of:

receiving a present memory access request from a first of said plurality of requesting applications;

accessing statistical data wherein said statistical data is a weighted average of sizes of initial free areas from prior memory access requests, said data based on collected values of sizes of initial free areas from prior memory access requests from the first requesting application;

setting a value of an initial free area for use by the present memory access request based on the accessed statistical data;

monitoring a total amount of memory used by said present memory access request until the initial free area is returned to the storage manager for assignment to another requesting application; and re-calculating the statistical data for the first requesting application based on the monitored total amount.

* * * * *